TAPE CODING DEVICE

Filed April 1, 1964

6 Sheets-Sheet 1

INVENTOR.
MERRITT J. BROWN
BY William P. Keegan
ATTORNEY

May 16, 1967 M. J. BROWN 3,319,516

TAPE CODING DEVICE

Filed April 1, 1964 6 Sheets-Sheet 2

INVENTOR.
MERRITT J. BROWN

BY William P. Keegan

ATTORNEY

May 16, 1967 M. J. BROWN 3,319,516

TAPE CODING DEVICE

Filed April 1, 1964 6 Sheets-Sheet 3

INVENTOR.
MERRITT J. BROWN
BY William P. Keegan
ATTORNEY

INVENTOR.
MERRITT J. BROWN
BY William P. Keegan
ATTORNEY

INVENTOR.
MERRITT J. BROWN
BY William P. Keegan
ATTORNEY

INVENTOR.
MERRITT J. BROWN
BY William P. Keegan
ATTORNEY 3,319,516
TAPE CODING DEVICE
Merritt J. Brown, Baldwin, N.Y., assignor to Eltra Corporation, a corporation of New York
Filed Apr. 1, 1964, Ser. No. 356,402
8 Claims. (Cl. 88—24)

This invention relates to a keyboard controlled coding device that perforates a tape in accordance with the actuated keys. More particularly, it relates to a mechanism for perforating a tape with codes representative of Chinese ideographs.

At the present time, there is considerable work being done in the field of machine translation of languages. The essence of such endeavors is to have an information storage and retrieval system wherein the information stored is, in effect, a bi-lingual dictionary. To obtain a translation, information representing one language is fed to the system and the equivalent information (transliteration) is retrieved therefrom. For example, in a Chinese to English translation, information corresponding to Chinese ideographs is transmitted to the system which thereupon provides in a print-out component the English meaning of the ideograph.

The machine translation systems are quite sophisticated information storage and retrieval apparatuses employing computers. Of course, there are problems of syntax or, in general, lexical problems that must be considered for a satisfactory machine translator, but these are not germane to the present invention which is concerned only with an apparatus for feeding coded information representative of the material to be translated to the computer.

The problems of machine translating Chinese are formidable in many respects, not the least of which is the provision of an input device for feeding information to the system. This arises from the absence of a Chinese alphabet with a nominal number of characters and the use, instead, of many thousands of ideographs. A basic vocabulary might include four thousand ideograph characters, which is sufficient to read an average newspaper. Technical literature may require from eight thousand to twelve thousand characters. A scholar would be familiar with many more ideograph characters, which may number upwards of forty-three thousand ideographs.

Thus, in order to feed information to a Chinese-English translating machine, it becomes necessary to select a desired ideograph and provide its unique code to the tape perforating device. Moreover, this should be done on a simplified keyboard having a nominal number, not thousands, of keys where each key represents an ideograph, since the key finding problem must be reduced to a minimum. This requirement is all the more important since it is contemplated that the persons operating the keyboard need not have a knowledge of Chinese other than to recognize a visual similarity between an ideograph and a key symbol.

A unique system of classifying Chinese ideographs was disclosed in U.S. Patent No. 2,613,795 issued October 14, 1952. It was there recognized that most, if not all, Chinese ideographs could be classified in families of relatively few ideographs each; a family being characterized by a unique upper left component. By selecting the pair of unique radicals, a family of Chinese ideographs is presented for visual observation. From this family the desired ideograph is selected for printing, in the patent, but for coding in the present application.

In carrying out the present invention there is provided a typewriter in which the keys bear Chinese ideograph component symbols, a paper tape perforator, a code storage device wherein codes representing the first two key strokes of an ideograph selection are stored until the third key stroke is effected to select the desired ideograph from a visually presented family of ideographs, at which time the codes representing the three key strokes are transmitted to the paper tape.

The keyboard apparatus is such that the sequence of operation of the keys defines the particular ideograph required and perforates a paper tape with a code representative of that ideograph. First the operator compares the upper component of the subject ideograph with the upper left portion of a key. The key which represents the upper component of the ideograph is then struck. The identical operation is then repeated comparing the lower portion of a key and the lower right component of the ideograph. Right after the second key stroke has been effected, a family of ideographs all having the selected upper and lower component is presented to a viewing window. The operator then depresses the key which has the same Arabic number as the selected ideograph in the viewer. This completes the definition of the ideograph. At this point the tape perforator sequentially perforates four code rows. This is accomplished by a pulse circuit which reads information from three separate relay memory banks. The first pulse reads the information from the first relay bank which causes the encoding of information corresponding to the first key stroke. The second and third pulses respectively encode information representative of the second and third key strokes while the fourth pulse adds a fixed word ending code. It might be noted that complete ideograph code may be effected by the operation of a single key undergoing three key strokes or by two keys being operated in any sequence; it is necessary only that three key strokes be effected to select an ideograph.

Features found in the keyboard apparatus include an interlock that prevents actuation of the keyboard until a previously keyboarded ideograph is encoded in the tape. Also, key strokes are not encoded in the tape until the operator selects the desired ideograph by effecting the third key stroke.

The ideograph display system of the present invention employs an array of ideographs arranged by families in an orthogonal array. An optical system, preferably of the type disclosed and claimed in Patent No. 2,942,538 issued July 17, 1958 is utilized to project, upon the actuation of two keyboard keys, a selected family of ideographs having a common upper left component and lower right component to a viewing screen. A third key stroke selects the desired ideograph from the family and causes the encoding of the ideograph signal representing all three key strokes.

Features and advantages of the invention may be gained from the foregoing and from the description of a preferred embodiment thereof which follows.

Figure 1:
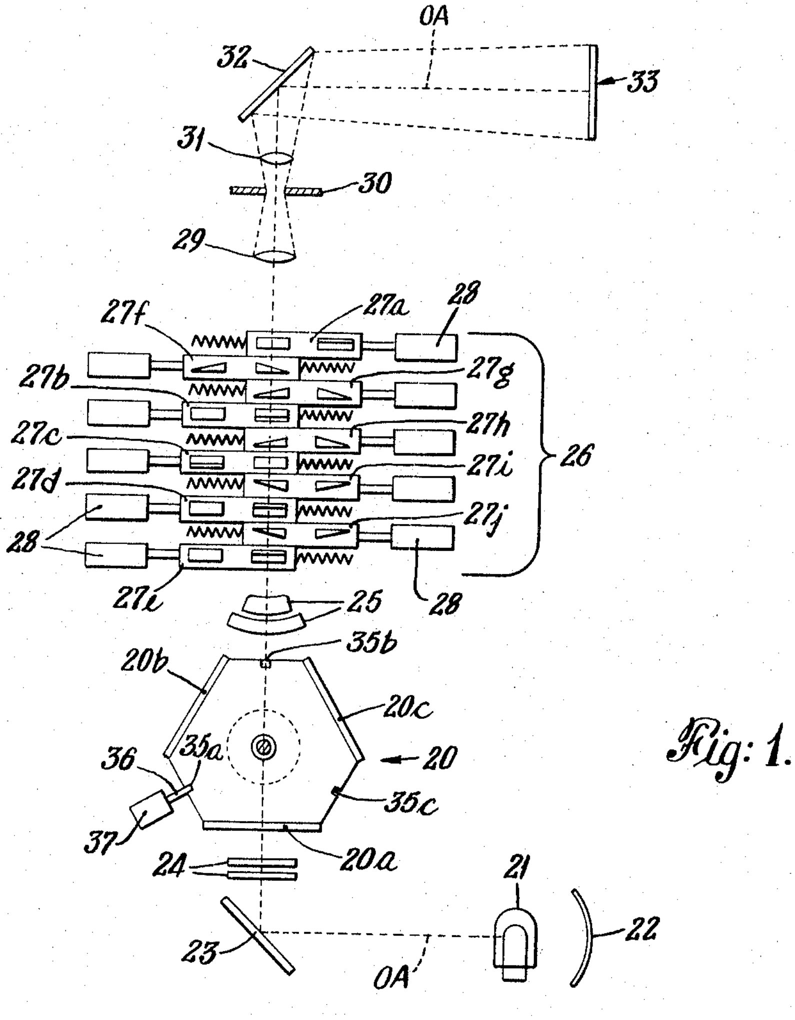
FIG. 1 is a diagrammatic presentation of the viewer scanner system which includes an optical wedge scanner and three photographic memory plates.

Referring to the drawings, FIG. 1 schematically shows the ideograph display apparatus of the present invention.

Referring to the drawings, FIG. 1 schematically shows the ideograph display apparatus of the present invention.

A photographic memory plate 20*a* which preferably includes a plurality of translucent ideographs on an opaque background is illuminated by a light source 21. The light therefrom is intensified and directed towards the ideograph plate 20*a* by means of a concave mirror 22 and a mirror 23 which is mounted to bend the optical axis OA of the apparatus and thereby make the apparatus more compact. In order to evenly illuminate the whole field of plate 20*a*, a Fresnel lens 24 is placed in the light path between mirror 23 and ideograph plate 20*a*.

An objective lens 25 is located such that the ideograph plate positioned on the optical axis is in the rear focal plane of the lens. Therefore, the light representing the array of ideographs is collimated by lens 25 before passing through the optical ideograph selecting mechanism 26.

This selecting mechanism comprises a plurality of optical wedge assemblies 27 arranged to be selectively positioned on the optical axis by the solenoids 28. Each assembly 27 comprises a pair of wedges of equal refracting strength arranged to refract the light in planes perpendicular to each other. Thus, if the *x*-axis of ideograph plate is considered as extending into the paper (FIG. 1), assemblies 27*a*, 27*c*, 27*d* (and 27*e* will select the ideographs arranged on an *x*-coordinate depending on the assemblies actuated, and refract them to the optical axis. Similarly, if the *y*-axis is considered as extending to the left (FIG. 1), assemblies 27*f*, 27*g*, 27*h*, 27*i*, and 27*j* will select the ideographs arranged on a *y*-coordinate, depending on the assemblies actuated, and refract them to the optical axis. By varying the refractive power of the selecting mechanism, any selected area of the ideograph array can be brought into coincidence with the optical axis of the system. For a more complete description of such an optical wedge selecting mechanism, see Patent No. 2,942,538 issued June 28, 1960.

The wedges are arranged in pairs rather than singly in order that the same amount of glass is positioned along the optical axis regardless of the number of wedge assemblies actuated at any time. This is done to retain the resolution qualities of the optical system under all conditions of operation. If resolution was not a consideration, the system could be arranged with a single wedge in each position that is either in or out of the path of the light transmitted through the system. A further consideration of the ideograph selecting mechanism is to keep the total prism power to a minimum in order to hold the angular field requirement for collimating lens 25 as low as practical. This results in the wedges for refracting the light in each direction being given refracting powers of 1.25, 2.5, 5.0, 10.0, and 12.5 diopters (binary 1, 2, 4, 8 and 10).

Following the selecting mechanism is a second objective lens 29 which is used to decollimate the light and form a real image of the ideograph memory plate in the plane of the mask 30. The mark is used as a field stop which blocks all light except that from the selected ideograph from being projected to the remainder of the system. The image of the selected ideograph is then re-imaged on the viewing screen 33 by the projection lens 31. A mirror 32 may be interposed along the optical axis to direct the light path to a convenient viewing position.

As shown schematically in FIG. 1, a six sided drum 20 is adapted to carry the three photographic memory plates 20*a*, 20*b* and 20*c* each of which contains a plurality of Chinese ideograph families. This drum is so mounted that upon actuation of a drum position circuit it presents the selected plate 20*a* to a position perpendicular to the optical axis OA of the optical scanner. The three alternate sides of the drum which carry the photographic plates have directly opposite therefrom a viewing window side, which allows the objective lens 25 to "look through" the drum at the presented plate illuminated by lamp 21. An obvious feature of this arrangement is its compact design.

It has already been indicated that the present invention contemplates an ideograph selection system based on thirty-six upper left hand radicals and thirty lower right hand radicals. Each combination of an upper left hand radical and a lower right hand radical represents a family of ideographs as taught in U.S. Patent No. 2,613,795, and when, in describing FIG. 1, an ideograph was mentioned, in fact, a family of ideographs would be selected and presented for viewing. The final selection of the desired single ideograph will be made by key actuation as described hereinafter.

It follows from the foregoing that the ideograph families can be arranged in a thirty-six by thirty area. However, the wedge selection mechanism 26 is based on a 1, 2, 4, 8, 10 binary scheme and can only resolve twenty-six positions in the *x* and *y* directions. Therefore, the ideograph array is arranged on more than one plate.

Figure 5:
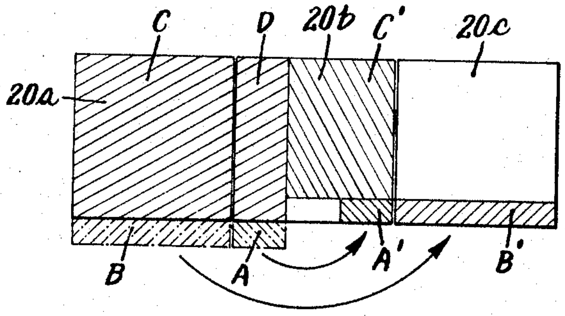
FIG. 5 depicts the three memory plates of the present invention and the location of the ideographs thereon.

The location of the ideographs on the three memory plates can be understood by reference to FIG. 5. The thirty-six by thirty array would be defined by points A, B, C and D. If the three twenty-six by twenty-six memory plates 20*a*, 20*b*, and 20*c* are superimposed over the array, then the excluded ideographs falling in area A are located in area A′ of plate 2 (20*b*). Those falling in area B are located in area B of plate 3 (20*c*).

It has been found that most ideograph families contain sixteen or less ideographs so each family area of a memory plate is arranged in a four by four subarray. (See FIG. 2) wherein up to sixteen ideographs can be located. However, certain ideograph families contain more than sixteen ideographs which cannot be contained within the basic four by four family area. These ideograph families are located in area C of plate 1 (20*a*) and area C′ of plate 22 (20*b*). The first sixteen ideographs of the family are located on plate 20*a* while the remaining ideographs are located on plate 20*b*. The same family will be identically located on both plates so that the same wedges of mechanism 26 will be actuated to select the family; it being only necessary to bring plate 20*b* into viewing position if the desired ideograph is not found on plate 20*a*. For example, if the upper radical key and the radical key select an ideograph family that contains more than sixteen ideographs, when the family on plate 1 is presented for viewing, a mark will appear in the lower right hand corner of the family area. This indicates that more than sixteen ideographs are in the family and a "page two" 20*b* should be scanned if the desired ideograph is not found on "page one" 20*a*. The operator would then press a push button to rotate drum 20 and bring plate 2 into viewing position.

It will be appreciated that the more commonly used ideographs will be located to minimize rotation of drum 20.

The drum 20 is schematically shown to comprise three detents 35*a*, *b*, and *c*, which are selectively engaged by a finger 36 which is actuated by a solenoid 37. A drum position circuit, controlled by relays 1DPR and 2DPR, to be described later, not only controls solenoid 37 but also acts to interconnect the drum 20 to, say, a simple puck drive (not shown). On the axis of drum 20 is a simple three pocket cam which is adapted to operate a group of microswitches each of which is associated with a particular photographic plate. These three switches are included in the drum position circuit and are electrically connected to the solenoid 37 such that after this solenoid is energized the drum will rotate until the selected plate is positioned, at which time the cam opens its associated microswitch, deenergizing solenoid 37 and disconnecting the puck drive. By this action the finger 36 will move to its normally biased position in engagement with a detent of drum 20. As is of course clear, this arrangement could be accomplished in any number of different ways and therefore the aforedescribed operation has only been briefly set forth in an illustrative fashion.

Figure 2:
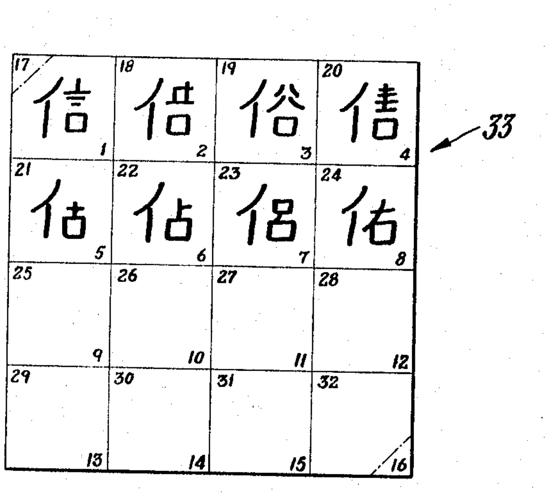
FIG. 2 depicts a representative ideograph family of FIG. 5 presented to a ruled operator viewer screen.
Figure 3:
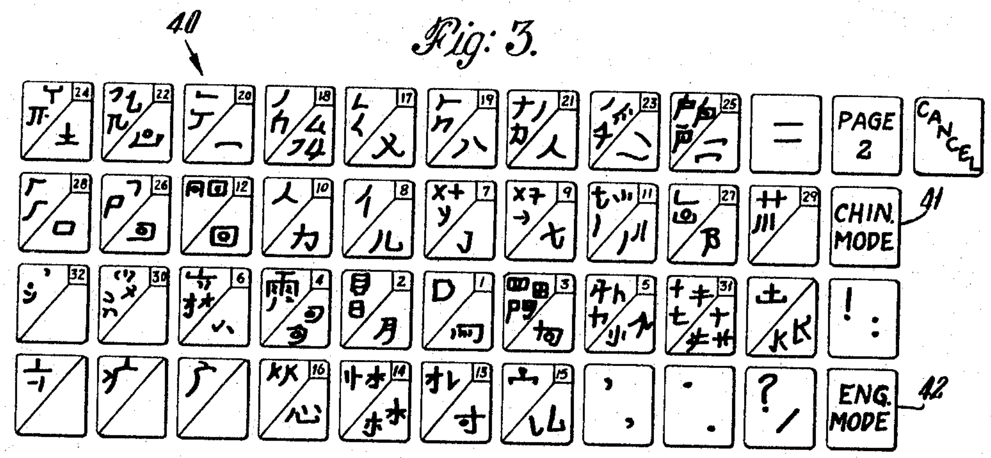
FIG. 3 shows the keyboard of the present invention having the various keys corresponding to upper and lower Chinese geometric characteristics and Arabic numerals.
Figure 4:
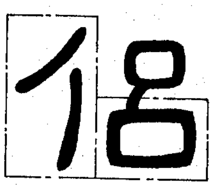
FIG. 4 depicts a specific Chinese ideograph selected from the family shown in FIG. 2 so as to show the common upper and lower geometric ideographs.

The keyboard 40 utilized in the present invention is shown in FIG. 3. It comprises 36 upper radicals and 30 lower radicals on the key buttons in place of the usual English characters. The upper radicals are indicated to the left of the diagonal stroke on the key while the lower radicals are indicated on the right of the stroke. In addition, the upper right hand portion of some of the keys is occupied by an Arabic number from 1–32. This number represents the subject ideograph. In FIG. 2, an ideograph family comprising 8 separate ideographs is shown. If, however, this family contained more than 16 ideographs and the subject ideograph was not located on the memory plate 20*a* than an operator would depress the page 2 button which would then rotate drum 20 until plate 20*b* was present to the optical axis. As will be seen, the depression of this key causes the energization of relay 1DP. Thereafter the operator would select a button having a number from 17–32 which corresponds to the subject ideograph. As shown in FIG. 2, screen 33 is provided with grid rulings vertically and horizontally so as to provide 16 separate boxes. Each box contains two numbers, the lower right indicates the first plate 20*a* while the upper left, page 2 or the second plate 20*b*. In relation to this selected ideograph family of FIG. 2, it will be observed that FIG. 4 depicts a single ideograph selected from that family. As is seen, the common top and the common bottom geometric radicals of the said family have been enclosed by ruled rectangles. Now, for example, if an operator desires to define the ideograph of FIG. 4 he would sequentially depress the key 8 and then the key 28 (see the keyboard of FIG. 3). At this time the optical scanner would select the family of FIG. 2 and present it to the ruled screen. The operator would then depress the finger key with the Arabic numeral 7 (FIG. 2) and the definition of the subject ideograph would be complete. Only after this third key stroke will the tape be coded with information of the selected ideograph. If, however, when an ideograph family was presented to the viewer it became apparent that it did not contain the desired ideograph, it would be clear that an operator had made a mistake in selecting either the top or bottom radical or both. At this time he would depress a cancelling key located on the keyboard which in turn would operate to clear the two separate signals held in storage relay banks and generated by the depression of the first and second key strokes. This is simply accomplished by energizing an end of ideograph relay EIR which when energized operates to clear all relays except the English Chinese relay ECR. This cancelling operation will become clearer when the control circuitry is explained. At this time the operator would correctly define the selected ideograph and after the third key stroke the control tape would be encoded.

Before considering the control circuitry for the present apparatus attention will be directed to the various circuit components that are utilized. These will be assigned various functional designations which should be of assistance in understanding the schematic diagram shown in the drawings.

The following electromagnetic relays are included in the circuitry. The designations listed will be applied to the relay coils while the same designations with numerals appended thereto will be applied to the relay contacts which are illustrated in the position taken when the relay coil is deenergized.

ECR—English-Chinese relay
1TR—1st transfer relay
2TR—2nd transfer relay
1UCR–6UCR—1st to 6th upper component relay
1LCR–6LCR—1st to 6th lower component relay
1NCR–6NCR—1st to 6th number component relay
EIR—End of ideograph relay
1HR–5HR—1st to 5th horizontal relay
1VR–5VR—1st to 5th vertical relay
1DPR–2DPR—1st and 2nd drum position relay
1PCR–3PCR—1st to 3rd punch control relay
TPM—Tape punch magnets
1OTR–2OTR—1st and 2nd output transfer relay
1SR–3SR—1st to 3rd stepper relay
1LR–4LR—1st to 4th logic relay In addition to the foregoing, there are a number of switches which are actuated by the keyboard. This, as is well understood, can be done in a number of ways; one common method is by utilizing a plurality of slidable permutation code bars actuable by each key stroke. As will be seen shortly, two different codes are actually generated at the keyboard. The first, a translator code, is fed to memory relay banks UCR, LCR and NCR, while the other operates the optical wedge scanner. The following is a list of switch banks and, as seen, different suffixes in each bank are used to differentiate one switch from another.

Figure 6:
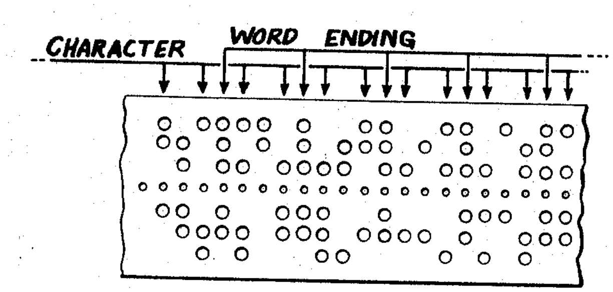
FIG. 6 depicts a six level tape perforated in accordance with the teachings of the present invention.
Figure 7:
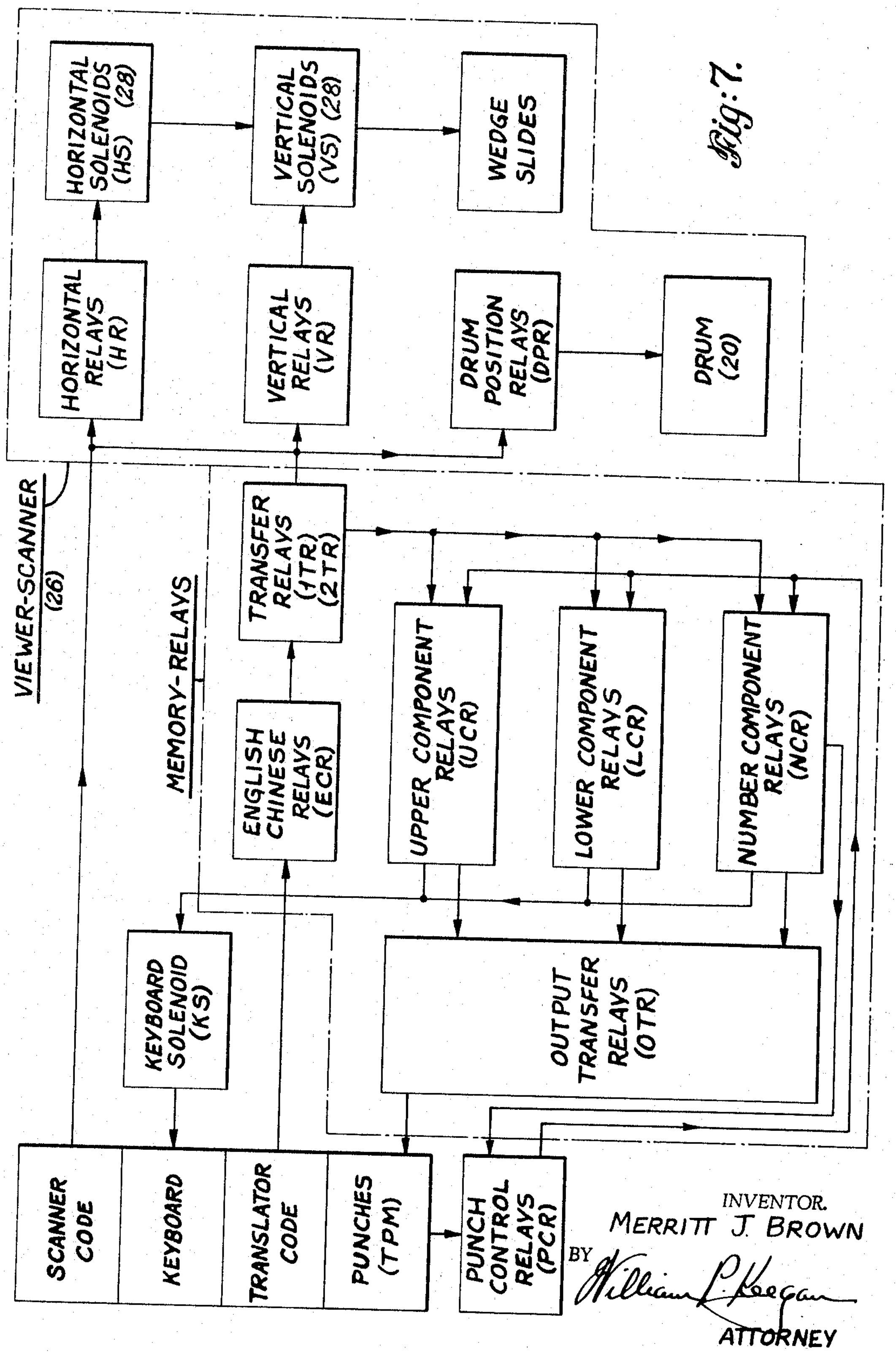
FIG. 7 is a showing a schemated block diagram layout of the tape perforator and its control system and a control system for the viewer scanner system.
Figure 8:
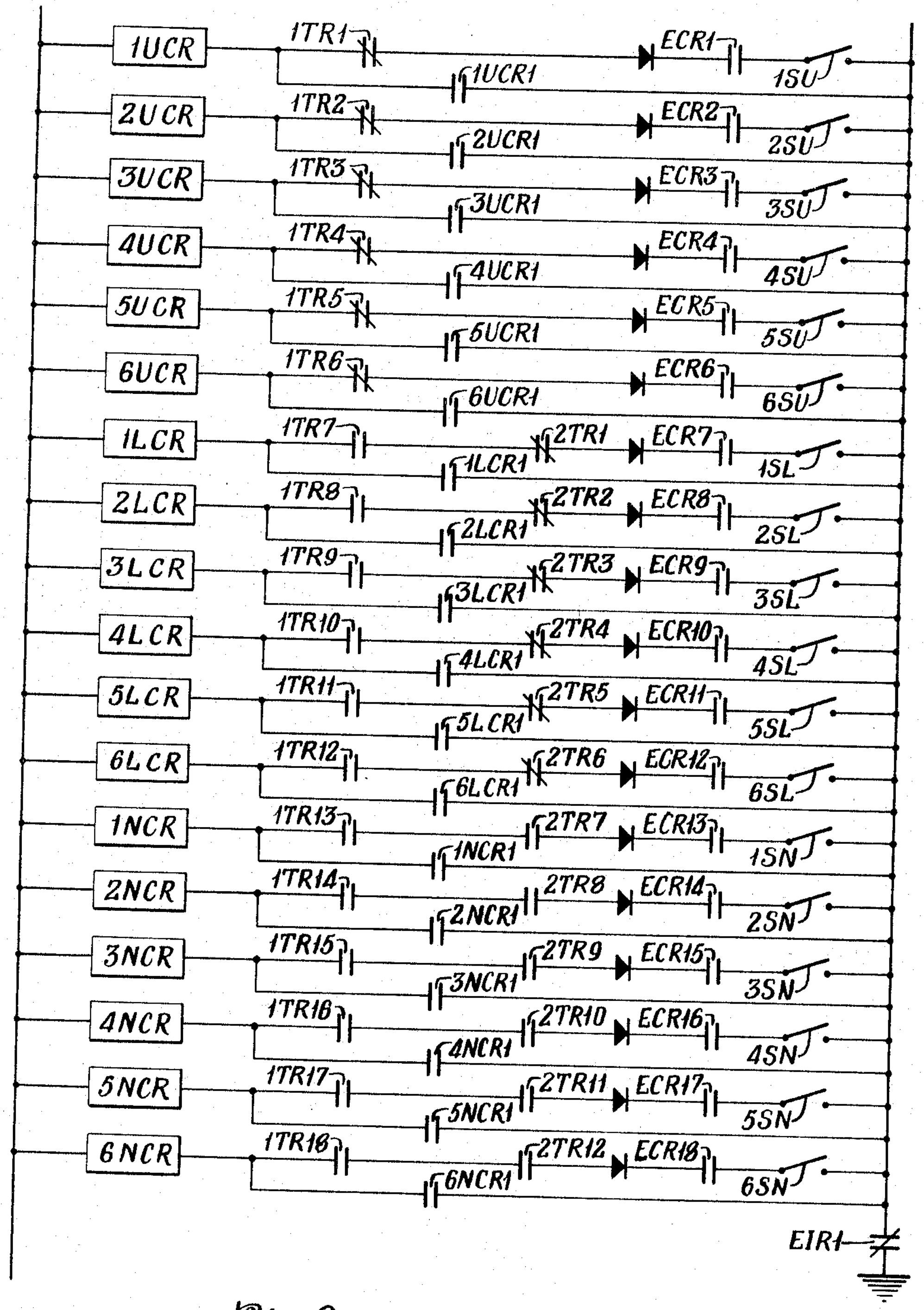
FIG. 8 is an electrical ladder diagram of the perforator memory storage relays.

1SH–5SH—1st to 5th horizontal relay switch
1SU–6SU—1st to 6th upper component switch
1SL–6SL—1st to 6th lower component switch
1SN–6SN—1st to 6th member component switch In FIG. 7 of the drawings is shown a schematic block diagram of a tape perforator and its control system and a control system for the viewer scanner system 26. Any standard tape perforator may be utilized with the present invention. For example, the Friden "Flexowriter" performs quite satisfactorily. The keyboard 40 employs the "Ming Kwai" geometric characteristic of Patent No. 2,613,795. Family classification is determined by upper and lower components or radicals. The resultant family consists of a number of ideographs. The classification system therefore requires a code indicating the upper and lower component or radical and a code for the specific subject ideograph. Thus a three level code can satisfactorily determine a dictionary meaning for each subject Chinese ideograph. FIG. 6 depicts the output of the present invention, a punched paper tape coding consisting of three code rows and a fixed code indicating the ideograph ending.

In order to place the system in operation the Chinese mode key 41 (FIG. 3) is depressed. This action causes the energization of English-Chinese relay ECR which effects to disconnect the punch from direct keyboard control and feeds the information interpreted from the key strokes into three relay banks, the upper component bank UCR, the lower component bank LCR, and finally the number component bank NCR. If at a later time English mode key 42 is depressed, relay ECR will be deenergized. The signals thereafter generated at the keyboard will be fed directly to the tape punch.

When operating in the Chinese mode the first and second key strokes operate not only the to be described punch control circuit, but also the viewer scanner system 26 as well. With ECR energized, the energization of any relay in bank UCR causes the energization of the first transfer relay 1TR. This relay operates to feed the binary code corresponding to the second key stroke into relay bank LCR. This bank thereafter energizes relay 2TR which causes the third key stroke to feed into bank NCR. At that time any energized relay in bank NCR causes keyboard solenoid KS to deenergize. This action locks the keyboard by preventing the depression of a finger key. The keyboard remains locked until after four code rows have been perforated and the subject ideograph defined. In addition, an energized relay in bank NCR activates a pulse control circuit PCR which is provided to sequentially feed the information stored in the said relay banks to the tape punch magnets TPM. Included in this circuit is an end-of-ideograph relay EIR that acts to inject the required word ending signal (see FIG. 11) and also clears the power from all energized relays except ECR.

Figure 9:
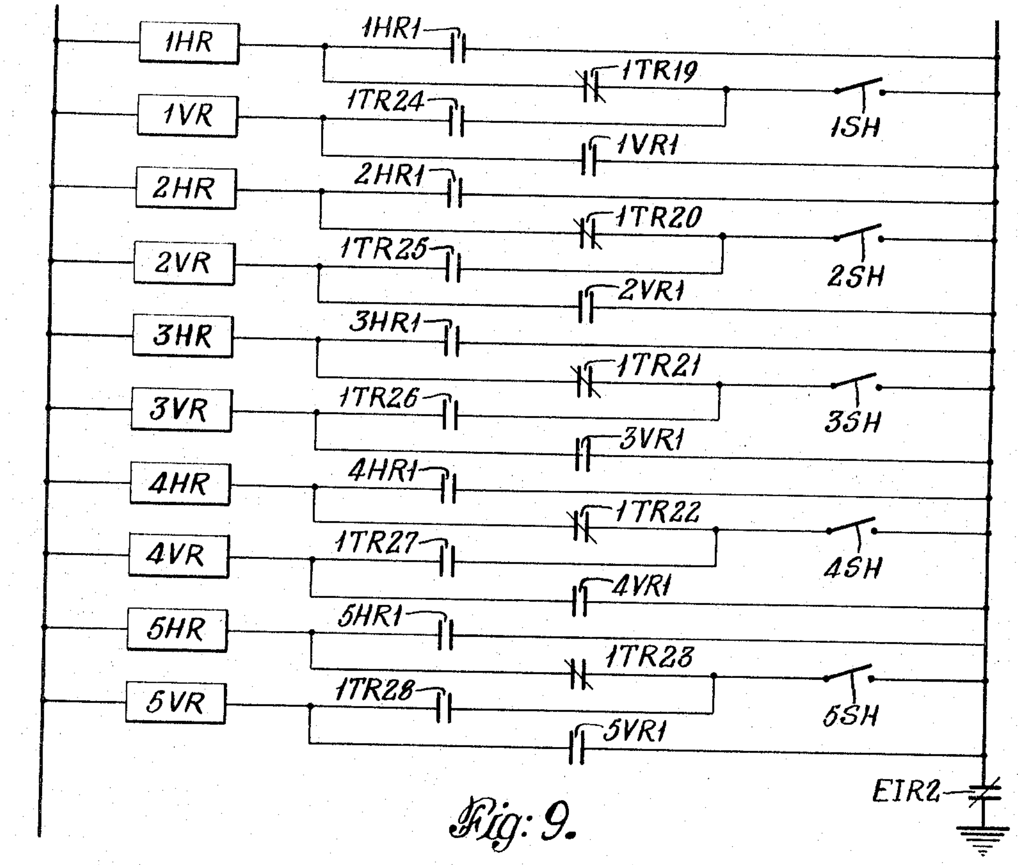
FIG. 9 is an electrical ladder diagram of the horizontal and vertical relays of the viewer scanner.
Figure 10:
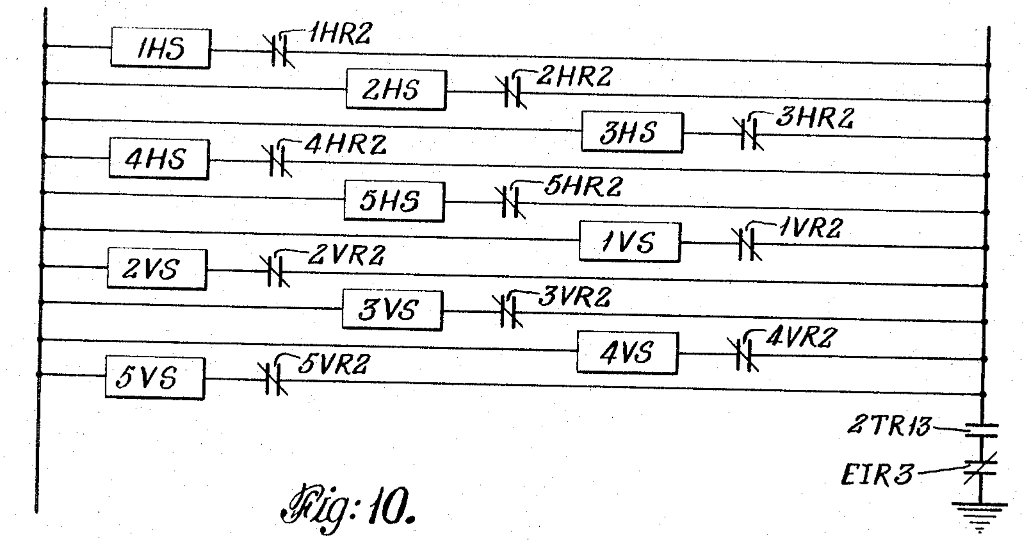
FIG. 10 is an electrical ladder diagram of the solenoids controlled by the relays shown in FIG. 8.

The viewer scanner comprises a number of components, photographic memory plates 20*a*, 20*b*, and 20*c*, and an optical wedge scanner system 26. The code derived to operate the solenoids HS and VS (28) is handled in a manner verys imilar to that of the memory relays. The first key stroke at the keyboard causes the energization of any of the five horizontal relays HR as any combination of the five switches SH is closed at the keyboard. Any selected horizontal relay HR is energized by the closure of its associated switch SH by way of its associated N.C. contacts 1TR (19–23). Thereafter an energized relay HR closes its own holding contacts in series therewith. As has been explained, any energized relay in the UCR bank energizes transfer relay 1TR. Relay 1TR when energized closes its N.O. contacts 1TR (24–28) and opens its N.C. contacts 1TR (19–23) and as a result thereof (see FIG. 9) at the next key stroke thereof when any of the switches SH are closed, their associated VR relays will be picked up. Any energized VR relay will thereafter form its own holding circuit by closing its N.O. first contacts. The requirements of the solenoid operated scanner is such that only a five level code is required. At this point in time the energized relays in the HR and VR banks have opened their N.C. second contacts in series with their associated scanner solenoids HS and VS. However, it is only after transfer relay 2TR is switched on by any relay in the LCR bank that any of the solenoids will be energized and their various slides positioned. This is physically accomplished when contacts 2TR–13 closes. Adjacent to contacts 2TR–13 are the N.C. contacts of relay EIR–2 and 3 which when opened operate to deenergize not only the solenoids HS and VS but their associated relays HR and VR as well.

As seen in FIGS. 1 and 5, and as already indicated, the present invention utilizes three photographic memory plates each of which is sized at 26 by 26 Chinese ideograph families. Thus a simplified position circuit was designed to determine which of the three plates should be used. If neither of the drum position relays 1DPR or 2DPR is energized, the first plate 20*a* will be scanned. If on the first key stroke an appropriate key is struck, relay 1DPR will be energized, which signals that the second plate 20*b* should be viewed. If on the second key stroke relay 2DPR is energized, then the third plate 20*c* will be viewed. If any operator determines, after viewing the first photograph plate, that the subject ideograph is not thereon, he will proceed to depress the second page key which effects to energize relay 1DPR. This action causes drum 20 to present plate 20*b* to the optical axis OA. The operator then views the continuation of the first family which is located in an identical position on the second plate. It is felt unnecessary to set forth in detail the circuit for the drum position relays as any simple arangement controlled by the selection of finger keys at the keyboard could be employed.

The control and operation of the relay storage banks will now be set forth. With the power on and relay ECR energized, the first key stroke representative of the upper component is completed through any selected relay coils UCR. Say, for example, that relay 1UCR is selected as switch 1SU is closed at the keyboard 40. A circuit is completed to 1UCR through the N.C. contacts 1TR1, an isolating diode, switch 1SU and out to ground through the N.O. contacts ECR1 and the N.C. contacts EIR1. Contacts 1UCR1 now close and form a holding circuit for 1UCR. In addition, see FIG. 12, a second set of contacts

1UCR2 interposed in the tape punch magnet circuit TPM close. Although only the first tape punch magnet TPM is shown, it is to be understood that there are six such magnets, one corresponding to a specific relay in each of the relay memory banks. A set of contacts of each relay in the UCR bank is so situated that when any one relay is energized, relay 1TR will thereafter be energized. 1TR opens all its N.C. contacts 1TR (1–6) in bank UCR preventing further energization of the bank. It further closes its N.O. contacts 1TR (7–12) in the LCR bank preparing those selected relays for operation by the depression of the second key stroke. The signal generated is fed through any selected relay in the LCR bank, through its associated N.C. contacts 2TR (1–6), through closed contacts of 1TR and ECR, through the selected switch SL and out to ground through ECR1. With the energization of any relay in the LCR bank relay 2TR is energized preparing the NCR bank for the third key stroke. At this point in time the selected ideograph family will have been presented to the viewer screen 33 by the viewer scanner system 26 in the manner previously described. With both transfer relays energized, contacts 2TR (7–12) and contacts 1TR (13–18) are closed. Thus, the selection of any given SN switch at the keyboard will cause the energization of its associated NCR relay. An energized relay in the NCR bank will thereafter close its first set of contacts forming a holding circuit.

Figure 11:
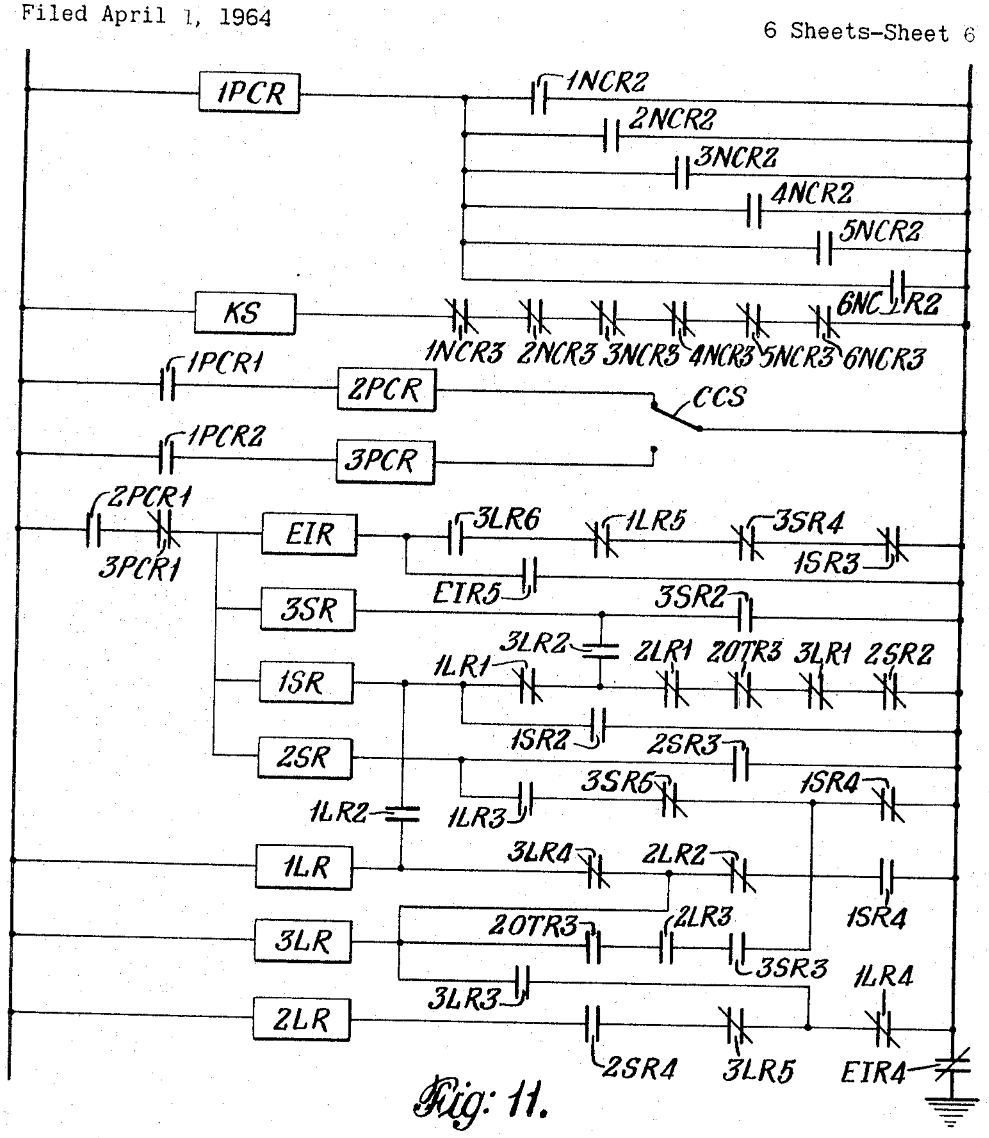
FIG. 11 is an electrical ladder diagram of the punch and output control system.

The third key stroke, as described, feeds the information to the NCR bank. As shown in FIG. 11, when any of the N.C. contacts NCR3 open, the keyboard lock solenoid KS will deenergize, locking the keyboard by preventing the further depression of a key until solenoid KS is again energized. Again, as shown in FIG. 11, when any relay in the NCR bank is energized, punch control relay 1PCR will be energized. This relay thereafter, in a manner shortly seen, initiates the operation of an output control circuit which includes the following stepper relays 1SR, 2SR, 3SR, and EIR. These relays serially control the read out of the memory banks to the tape punch magnets TPM. When relay 1PCR is energized, it allows a standard type cam controlled tape punch mechanism (not shown) to begin rotating. This mechanism will be understood not only to perforate the tape but also to advance the tape. In addition, when relay 1PCR is energized, it closes its contacts 1PCR1 thereby activating relay 2PCR. The rotating tape punch mechanism control switch CCS by say a rocking cam and acts to close a circuit to either relay 2PCR or 3PCR depending upon the relative position of the tape punch mechanism. The function of these punch control relays will be seen when the output control circuit is explained.

Figure 12:
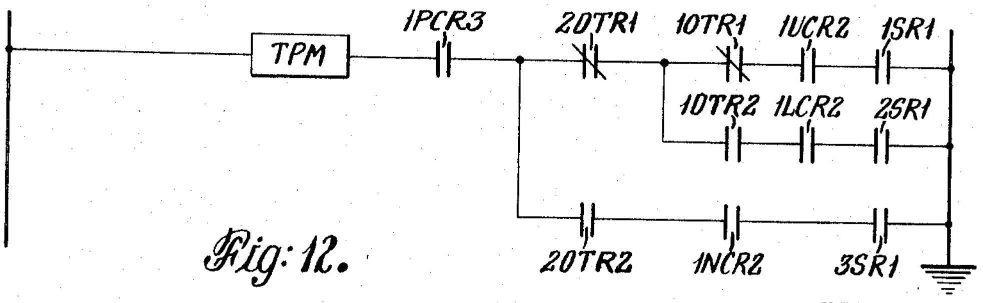
FIG. 12 depicts an electrical ladder diagram of one of the six magnetic tape punches.

In FIG. 12 only the first of six tape punch magnets is shown as the operation of the others is identical thereto. When 1SR is energized and normally open contact 1UCR2 is closed, a circuit is completed to relay TPM by way of the N.C. contacts 2OTR1, 1OTR2, and the N.O. contacts 1PCR3 and 1SR1. Thus, at this time, if relay 1UCR has been energized otherwise, the circuit to its magnet will remain open. When TPM is energized, it thereafter operates to perforate the control tape. In the next cycle, when cam switch CCS again is positioned so as to energize relay 2PCR relay 2SR will thereafter be energized. When energized this stepper relay closes contact 2SR1 and switches on the coil of output transfer relay 1OTR (not shown) which in turn opens its contacts 1OTR1 in series with contacts 1UCR2 and closes its contacts 1OTR2 in series with the LCR bank contacts 1LCR2. Information will then be transferred from the LCR bank to the TPM magnets. In the next cycle of operation when relay 2PCR is re-energized, stepper relay 3SR will energize. This stepper relay operates to close contacts 3SR1 and switch on relay 2OTR which in turn effects to transfer information from the NCR bank to the tape punch magnets by closing contacts 2OTR2. On the fourth cycle relay EIR is energized, which effects to de-energize all relays except ECR. In addition, 1EIR operates to energize a diode matrix (not shown) which is electrically connected to the tape punch magnets and causes same to add the fix code word ending shown in FIG. 6. When 1PCR is deenergized it of course operates to shut off the tape punch and advance mechanisms.

The operation of the output control circuit will now be explained. When relay 1PCR is energized it in turn causes the energization of relay 2PCR as it closes its N.O. contacts 1PCR1. See FIG. 11. Relay 2PCR closes its contacts 2PCR1 and thus completes a circuit to relay 1SR through the following N.C. contacts 3PCR1, 1LR1, 2LR1, 2OTR3, 3LR1, 2SR2, and EIR4. When relay 3PCR is energized by the operation of switch CCS its N.C. contacts 3PCR1 will be opened, thus open circuiting relay 1SR. Before that time, however, relay 1SR will close its holding contacts 1SR2 and contacts 1SR4 in series with relay 1LR completing a circuit to same through N.C. contacts 3LR4 and 2LR2. Relay 1LR holds itself by its N.O. contacts 1LR2 and N.O. contacts 1SR2. It also opens contacts 1LR1 which later prevent re-energization of relay 1SR. Relay 1LR also closes contacts 1LR3 in series with relay 2SR and N.C. contacts 3SR5 and 1SR4. Thus, when switch CCS rocks to energize relay 2PCR, relay 2SR will be energized. When 2SR energizes by way of contacts 1LR3 it closes its own holding contacts 2SR3 and contacts 2SR4 in series with relay 2LR. As previously indicated, relay 2SR activates relay 1OTR which applies a signal from memory bank LCR to the punch magnets TPM. Relay 2LR opens its contacts 2LR1 in series with 1LR preventing the energization of these relays on the next cycle of switch CCS. As clearly shown, N.O. contacts 1LR3 will prevent relay 2SR from reenergizing. Relay 3SR, however, is now prepared to be energized as the contacts 3LR2 are closed. After energizing, relay 3SR closes its own holding contacts 3SR2 and its contacts 3SR3 in series with relay 3LR. Relay 3LR will thereafter be energized as contact 2LR3 had previously been closed. Again, as previously indicated, relay 3SR operates to energize relay 2OTR which establishes a path from MCR bank to the punch magnets and closes contacts 2OTR3. Relay 3LR forms its own holding circuit, closing its contacts 3LR3 through contacts 1LR4. Relay 3LR also opens its contacts 3LR1, 3LR4, and 3LR5, which respectively prevent the energization of relays 3SR, 1SR, 2SR, 1LR, and 2LR. Relay 3LR, however, by closing its N.O. contacts 3LR6 in series with relay E1R establish a circuit path to this relay through N.C. contacts 1LR5, 3SR4, and 1SR3 on the next cycle of cam switch CCS. This relay, as previously indicated, operates to generate the fixed code on the tape and at the same time remove power from all relays and solenoids except relay ECR, thereby returning both the translator and viewer scanner systems to a zero state. It, of course, operates after a fixed time to deenergize itself.

Inasmuch as many apparently widely different embodiments can be made without departing from the spirit or scope of the present invention, it is to be understood that the specification and drawings are to be interpreted in an illustrative rather than in a limiting sense.

What is claimed is:

1. A Chinese ideograph coding mechanism wherein the code signals are based on an upper radical-lower radical classification system, said mechanism comprising a keyboard having keys representative of upper radicals, lower radicals and ideographs within an ideograph family defined by an upper radical and a lower radical, a first signal storage banks means for storing an upper radical signal in response to the actuation of a key representing an upper radical, a second signal bank means for storing a lower radical signal in response to the actuation of a key representing a lower radical, a third signal storage bank means for storing an ideograph signal in response to the actuation of a key representing an ideograph in the family defined by the upper radical and lower radical represented by the signals stored in said first and said second signal storage bank means, signal means, and means responsive to the storage of the ideograph signal for sequentially encoding on the signal means the signals stored in the first, second, and third signal storage bank means.

2. A Chinese ideograph coding mechanism according to claim 1 including means responsive to the encoding of the stored signals for clearing the first, second and third storage bank means.

3. A Chinese ideograph coding mechanism according to claim 2 including key means for cancelling signals stored in the first and the second storage bank means prior to their encoding on the signal means.

4. A Chinese ideograph coding mechanism according to claim 1 including means for encoding on the signal means an end of ideograph signal following each group of signals encoded from the signal storage bank means.

5. A Chinese ideograph coding mechanism according to claim 1 including means responsive to the actuation of keys representing an upper radical and a lower radical for displaying a family of ideographs having the same upper and lower radical as those represented by the actuated keys.

6. A Chinese ideograph coding mechanism according to claim 5 wherein the displaying means includes an ideograph plate having the ideographs arranged in families thereon, means responsive to key actuation for selecting the family if ideographs to be displayed, viewing means, and optical means for projecting an image of the selected ideograph family to the viewing means.

7. A Chinese ideograph coding mechanism according to claim 6 wherein the displaying means includes a plurality of ideograph plates and the selecting means includes means for bringing one of said plates into viewing position.

8. A Chinese ideograph coding mechanism according to claim 6 wherein the displaying means includes a plurality of ideograph plates on which ideographs of the same family are located in like positions on each, and including means for bringing a second plate into viewing position if the desired ideograph is not found on the plate first in viewing position.

References Cited by the Examiner

UNITED STATES PATENTS

| | | | |
|---|---|---|---|
| 2,121,061 | 6/1938 | Townsend | 40—53 |
| 2,613,795 | 4/1946 | Yutang | 197—1 |
| 2,942,538 | 6/1960 | Bechtold | 88—24 |

NORTON ANSHER, *Primary Examiner.*

V. A. SMITH, R. A. WINTERCORN *Assistant Examiners.*